Sept. 11, 1934.  W. L. MORRISON  1,973,011
STABILIZING DEVICE FOR PASSENGERS IN AUTOMOBILES
Filed Oct. 22, 1931
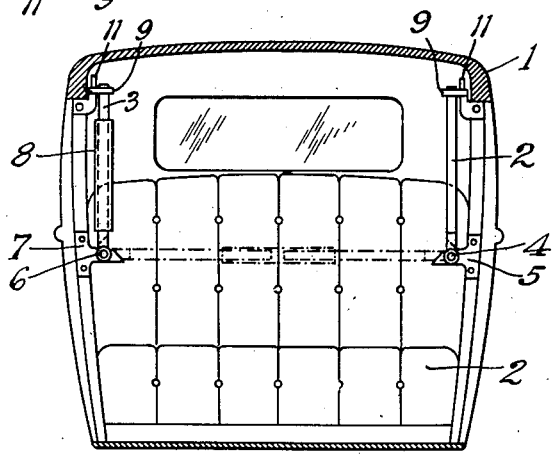
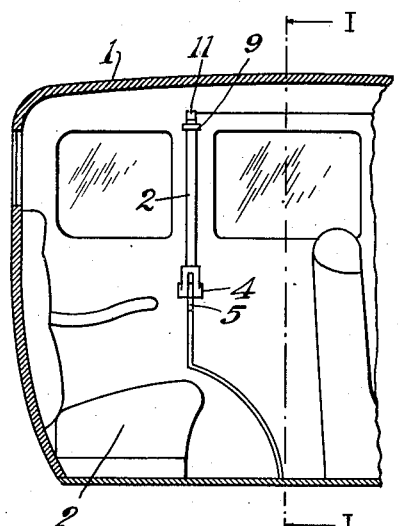
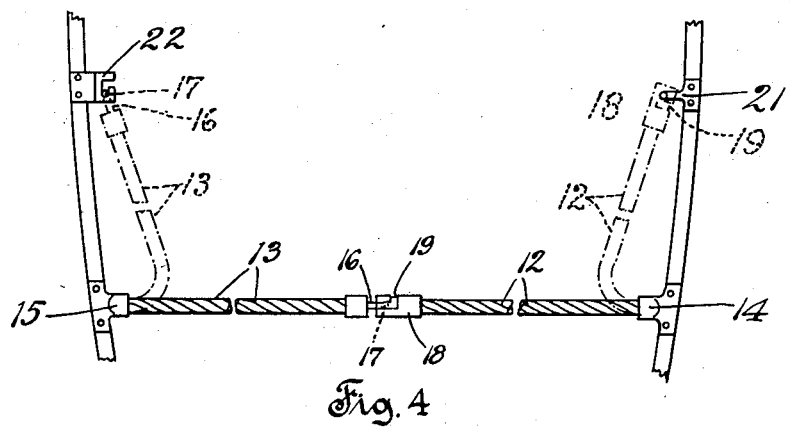
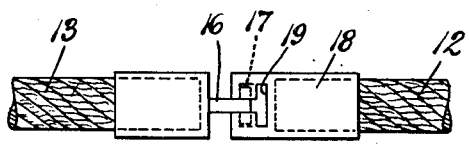
Inventor
Willard L. Morrison
by Parker & Carter
Attorneys Patented Sept. 11, 1934

1,973,011

UNITED STATES PATENT OFFICE 1,973,011

STABILIZING DEVICE FOR PASSENGERS IN AUTOMOBILES

Willard L. Morrison, Chicago, Ill.

Application October 22, 1931, Serial No. 570,370

4 Claims. (Cl. 280—150)

This invention relates to stabilizing devices for passengers in automobiles and has for its object to provide a new and improved device of this description. Passengers riding in automobiles, as for example in the back seat, at the present time have no means for preventing their being thrown forward when the brakes are put on suddenly or upward when the automobile goes over a severe bump. The present invention provides means for preventing these movements of the passengers and of stabilizing such passengers when riding in the automobile. The invention has other objects which are more particularly pointed out in the accompanying description.

Referring now to the drawing, Fig. 1 is a sectional view through an automobile body taken on line 1—1 of Fig. 2, showing the rear seat with one form of device embodying the invention in position;

Fig. 2 is a longitudinal sectional view through the rear portion of the automobile body;

Fig. 3 is a plan view showing one of the holding devices for holding the sections of the stabilizing device against the side of the car.

Fig. 4 is a view showing a modified construction where the stabilizing device is made of flexible sections;

Fig. 5 is an enlarged view showing the means of connecting the flexible sections together.

Like numerals refer to like parts throughout the several figures.

Referring now to the drawing, I have shown the body 1 of an automobile and the rear seat 2 thereof. Associated with the rear seat is a stabilizing device which, in Figures 1, 2 and 3, consists of two members 2 and 3 which may be made of stiff material, such as metal or the like. These members are movably connected at their ends to the sides of the automobile body. As herein shown, the member 2 is pivoted at 4 to a bracket 5 connected with the automobile body, and the member 3 is pivoted at 6 to the bracket 7 on the automobile body. Associated with one of these members is a connecting member 8. As shown in full lines in Fig. 1, the members 2 and 3 are in a substantially vertical position against the sides of the automobile body and are held in this position by the holding devices 9, which are shown as holding pieces with openings 10 therein which pass over the ends of the members 2 and 3. These holding devices are slidably connected to the supports 11 attached to the automobile body. When the sections 2 and 3 are in the position shown in full lines in Fig. 3, they may be grasped by the passengers so as to assist them in getting in and out of the car. When the passengers are in the car, the holding devices 9 are moved upwardly so as to release the members 2 and 3, and these members are then moved down to a substantially horizontal position, as shown in dotted lines in Fig. 3, and the member 8 is then moved so as to slip over the end of the member 2, thereby connecting the members 2 and 3 together.

Some means is provided for preventing the accidental movement of the member 8, such as proper frictional contact or a suitable locking device. In Figs. 4 and 5 I have shown a modified construction where the stabilizing device is made up of the sections 12 and 13 of flexible material, such as cables or cords. The ends of these sections are attached to the sides of the car in any desirable manner, as by being connected with the attaching members 14 and 15. The free ends of the sections 12 and 13 are provided with connecting pieces so that they can be connected together, as shown in Fig. 4. I have illustrated simple connecting pieces consisting of a member 16 on one of the sections, as at section 13. This member is provided at its end with a cross piece 17 which fits into an opening in the end piece 18 on the member 12. The top 19 of this opening is at a distance from the end of the end piece 18 and the opening has a horizontal portion along which the cross piece 17 slides, taking the position shown in Fig. 4. When the passengers desire to alight from the automobile, the ends of the sections 12 and 13 are disconnected and are connected to the sides of the car, as by being attached to the brackets 21 and 22.

When the stablizing device is in the horizontal position, the passengers on the back seat may grasp the stabilizing device with their hands or may rest their elbows upon it, and it will be seen that they are thereby stabilized and that if the brakes are suddenly applied, the passengers will not be thrown forward, or if the body portion of the automobile is given a severe bump, as by the wheels going into a rut or striking an obstruction, the passengers will not be bounced upwardly but may hold themselves in position by means of the stabilizing device.

It will further be seen that this stabilizing device removes many of the objectionable features attending riding in the back seat of the automobile. It will further be seen that this device can be easily and quickly installed in new automobiles, or in any of the present automobiles. When the passengers desire to get out of the automobile, the member 8 is slid onto the member 3 and the two members then fastened in their vertical position, as shown in Fig. 3.

The importance of this device will be readily seen when it is noted that the stabilizing device will prevent the passengers from being thrown forward by a sudden stop or a collision so as to be injured, and it further prevents the passengers from being thrown up so that their heads are bumped on the roof of the car.

I have shown in Figs. 4 and 5 a modified construction, but to make such a device satisfactory it would have to be arranged so that it would be very taut when in position shown in full lines, for otherwise it would move up and down. The construction which is satisfactory in every way is the rigid construction shown in Figs. 1, 2 and 3, as this construction, when in position, has no appreciable up and down or sidewise movement and therefore acts as a rigid stabilizer for the passenger.

While the two-section device is preferable, it is of course evident that a single section might be used. In the construction of automobile bodies it is a general practice to leave a clearance around the door frame and provide overlapping metal coverings to conceal this clearance. The stabilizer can thus be attached to these cars after they are sent out from the factory without cutting a notch in the door post. The brackets 7 may be placed in these clearance spaces.

I claim:

1. A stabilizing device for passengers of automobiles, comprising two members hinged to the sides of the automobile, means for fastening said members to the automobile above the hinged portions to provide hand holds for passengers in the automobile, said members adapted to be brought into substantial alignment, and means for removably connecting the adjacent ends of the sections together.

2. A stabilizing device for passengers of automobiles, comprising two members hinged to the sides of the automobile and adapted to be brought into substantial alignment, means for removably connecting the adjacent ends of the sections together, and holding devices connected with the sides of the car above the points where said sections are hinged, adapted to hold said sections in an upright position when the passengers are entering and leaving the automobile.

3. A stabilizing device for passengers of automobiles comprising opposed flat brackets connected with the vertical faces of the door frames opposed to the edges of the doors and adapted to be concealed by the door when closed each having a portion which projects inwardly beyond the inner face of the associated door, a rigid member hinged to each of the inwardly projecting portions of said brackets and in proximity to the automobile seat, said members adapted to be moved with their ends in proximity to each other and means associated with the adjacent ends of said members for holding them in substantial alignment.

4. A stabilizing device for passengers of automobiles comprising brackets inserted between the door and the door frame and attached to the door frame, two separated members one movably connected with each of said brackets, means for connecting the adjacent ends of said members together to form a cross member extending in front of the passenger on the seat, and means for moving said cross members out of the way when the passenger is entering and leaving the automobile and fastening means for fastening said members to the sides of the automobile when not in use.

WILLARD L. MORRISON.